United States Patent
Shin

(10) Patent No.: US 9,619,475 B2
(45) Date of Patent: Apr. 11, 2017

(54) APPARATUS AND METHOD FOR PROVIDING SAFETY LEVEL OF UNIFORM RESOURCE LOCATOR

(71) Applicant: Samsung Electronics Co., Ltd., Gyeonggi-do (KR)

(72) Inventor: Sung-Jae Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 35 days.

(21) Appl. No.: 14/706,429

(22) Filed: May 7, 2015

(65) Prior Publication Data

US 2015/0381643 A1 Dec. 31, 2015

(30) Foreign Application Priority Data

Jun. 27, 2014 (KR) ........................ 10-2014-0080050

(51) Int. Cl.
*H04L 29/06* (2006.01)
*G06F 17/30* (2006.01)

(52) U.S. Cl.
CPC .. *G06F 17/30106* (2013.01); *G06F 17/30887* (2013.01); *H04L 63/1483* (2013.01)

(58) Field of Classification Search
CPC ......... G06F 17/30106; G06F 17/30887; H04L 63/1483
USPC .......................................................... 726/22
See application file for complete search history.

(56) References Cited

U.S. PATENT DOCUMENTS

| | | | |
|---|---|---|---|
| 7,873,656 B1* | 1/2011 | Soubramanien | G06F 9/545 707/716 |
| 8,661,115 B2* | 2/2014 | Watanabe | G06F 21/554 709/224 |
| 8,949,978 B1* | 2/2015 | Lin | G06F 21/51 726/12 |
| 2004/0215810 A1* | 10/2004 | Tan | H04L 29/06027 709/232 |
| 2006/0206571 A1* | 9/2006 | Kuwahara | H04L 51/12 709/206 |
| 2008/0082662 A1* | 4/2008 | Dandliker | H04L 63/10 709/225 |
| 2011/0145435 A1* | 6/2011 | Bhatawdekar | G06F 21/566 709/238 |
| 2011/0191849 A1* | 8/2011 | Jayaraman | H04L 63/1416 726/23 |
| 2012/0173874 A1* | 7/2012 | Brown | H04L 63/0823 713/157 |
| 2013/0036466 A1* | 2/2013 | Penta | H04L 63/102 726/22 |
| 2014/0298460 A1* | 10/2014 | Xue | H04L 63/1483 726/23 |

FOREIGN PATENT DOCUMENTS

KR 10-1318668 10/2013

* cited by examiner

*Primary Examiner* — Michael S McNally
(74) *Attorney, Agent, or Firm* — The Farrell Law Firm, P.C.

(57) ABSTRACT

A method and an electronic device for determining the reliability of a Uniform Resource Locator (URL) is provided. The method includes receiving a selection of a displayed URL, detecting a reliability of the selected URL, and providing a safety level of the URL based on the detected reliability.

16 Claims, 10 Drawing Sheets

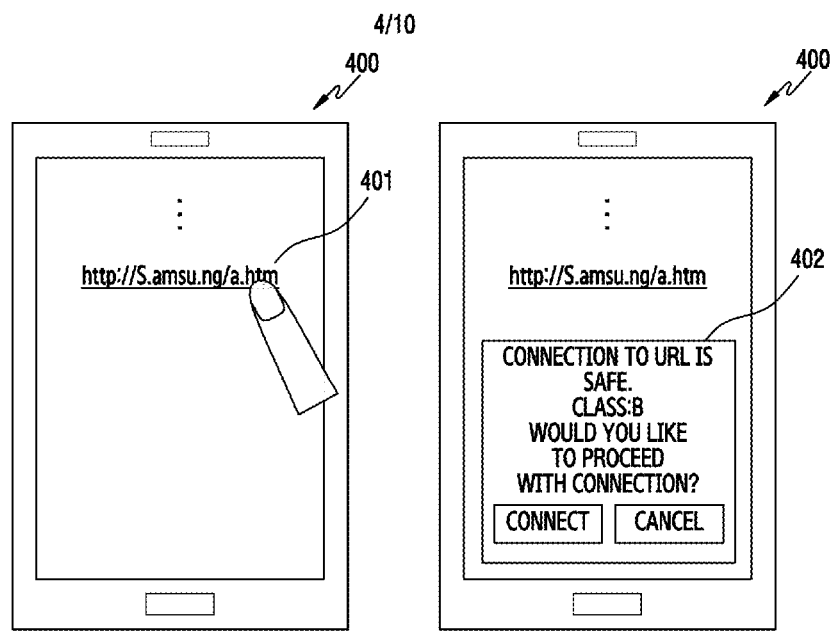
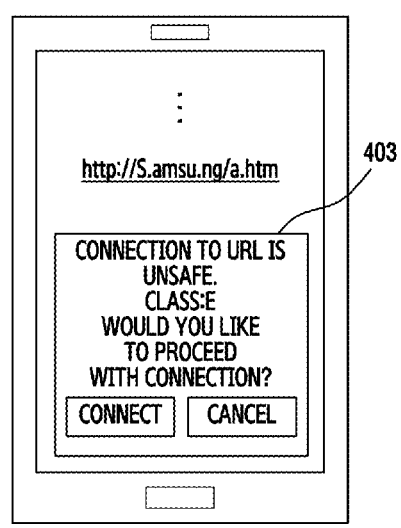
FIG.4A
FIG.4B
FIG.4C

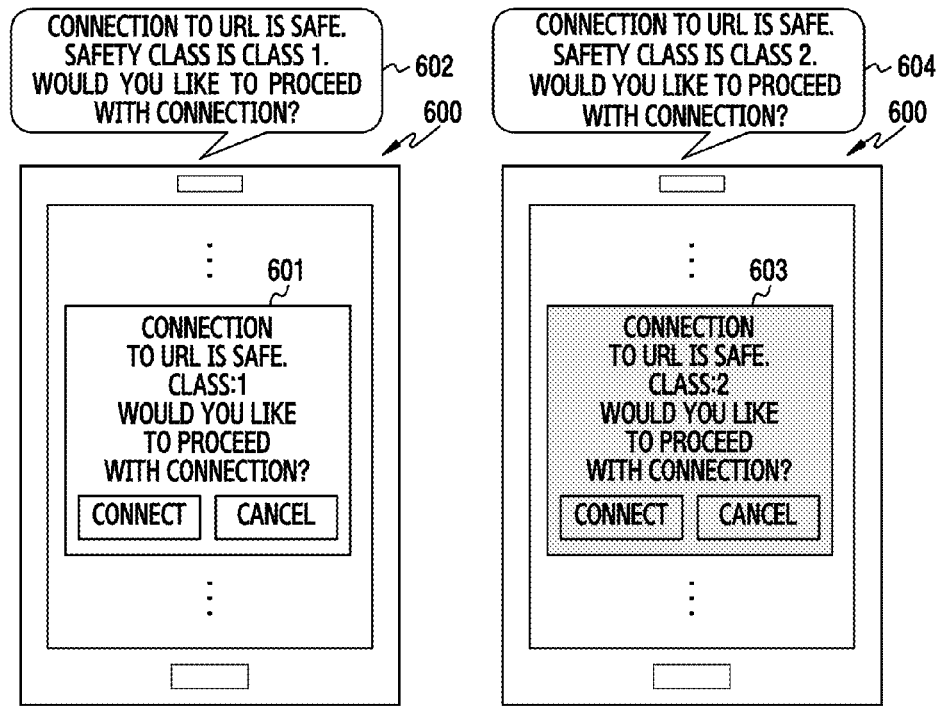
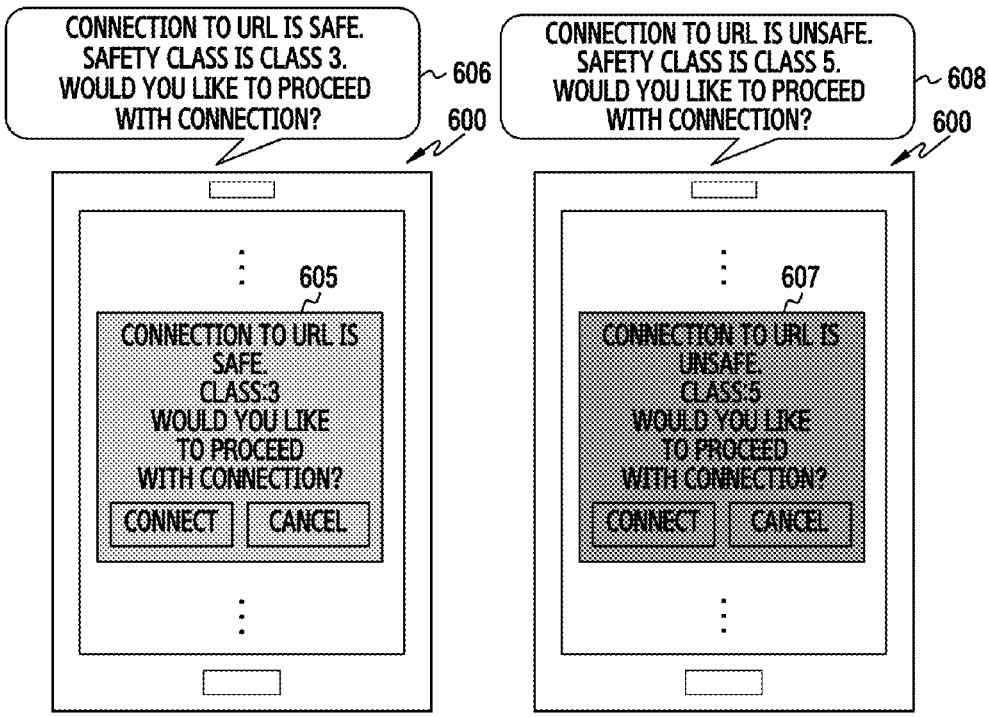
FIG.6A  FIG.6B  FIG.6C  FIG.6D

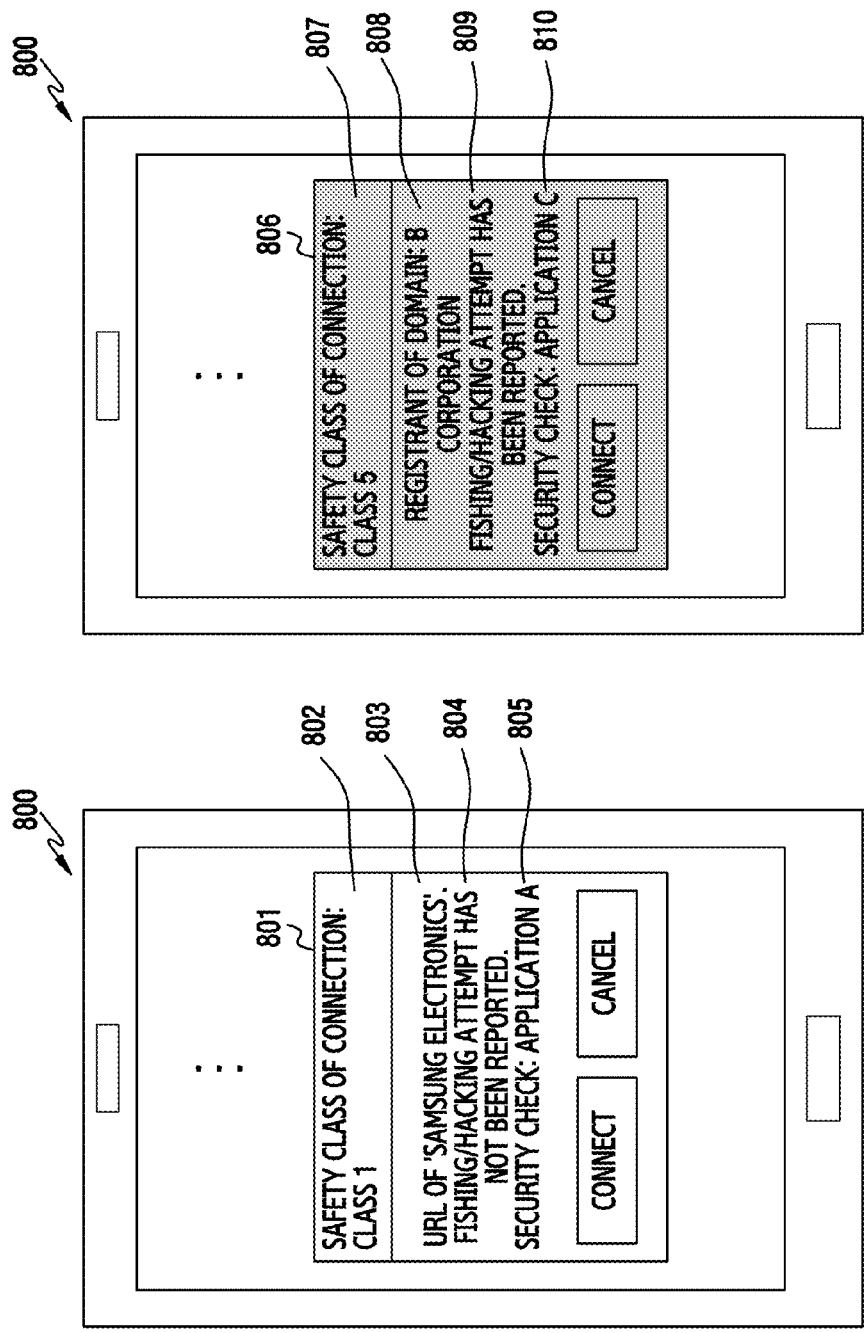

APPARATUS AND METHOD FOR PROVIDING SAFETY LEVEL OF UNIFORM RESOURCE LOCATOR

PRIORITY

This application claims priority under 35 U.S.C. §119(a) to Korean Patent Application Serial No. 10-2014-0080050, filed in the Korean Intellectual Property Office on Jun. 27, 2014, the entire content of which is incorporated herein by reference.

BACKGROUND

1. Field of Disclosure

The present disclosure relates generally to an electronic device that provides a safety level of a Uniform Resource Locator (URL) and a method thereof.

2. Description of the Related Art

As functions of electronic devices have developed, various functions are provided through an electronic device. For example, a user may access a web browser so as to check real-time news, or to exchange opinions with other users over a social network or the like.

In addition, by selecting a Uniform Resource Locator (URL) provided in the form of a hyperlink displayed on the display of an electronic device, the URL directly connects a user to a predetermined website, and thus, the needs of the user may be satisfied.

However, when an electronic device displays a URL included in a message received from another electronic device, a user may not be certain of the safety or security of the URL when the URL is unfamiliar or is provided in a shortened form. Accordingly, a need to detect the safety, security level, and reliability of a URL is needed.

SUMMARY

The present disclosure has been made to address at least the problems and disadvantages described above, and to provide at least the advantages described below.

Accordingly, an aspect of the present disclosure is to detect a reliability of a URL every time that a device exposes a URL to a user or detect a reliability of a URL every time that a user selects a URL.

Accordingly, another aspect of the present disclosure is to provide the user with a safety level of a selected URL based on a detected reliability, and thus, provide a method and device that secures the safety and security of the user.

In accordance with an aspect of the present disclosure, a method of an electronic device is provided. The method includes receiving a selection of a displayed Uniform Resource Locator (URL), detecting a reliability of the selected URL, and providing a safety level of the URL, based on the detected reliability.

In accordance with another aspect of the present disclosure an electronic device is provided. The device includes a display and a processor. The processor is configured to receive a selection of a displayed Uniform Resource Locator (URL) on the display, detect a reliability of the selected URL, and provide a safety level of the URL based on the detected reliability.

Accordingly, another aspect of the present disclosure is to detect whether a URL is modulated, and to execute an application for detecting the reliability of a URL, and thus, provide a method and device that verifies the stability of a user.

BRIEF DESCRIPTION OF THE DRAWINGS

The above and other aspects, features, and advantages of the present disclosure will be more apparent from the following detailed description taken in conjunction with the accompanying drawings, in which:

FIGS. 4A to 4C illustrate a method of providing a safety level of a Uniform Resource Locator (URL), according to an embodiment of the present disclosure;

FIGS. 6A to 6D illustrate a method of providing a safety level of a URL, according to another embodiment of the present disclosure;

FIGS. 8A and 8B illustrate a method of providing a safety level of a URL, according to another embodiment of the present disclosure;

DETAILED DESCRIPTION

Figure 1:
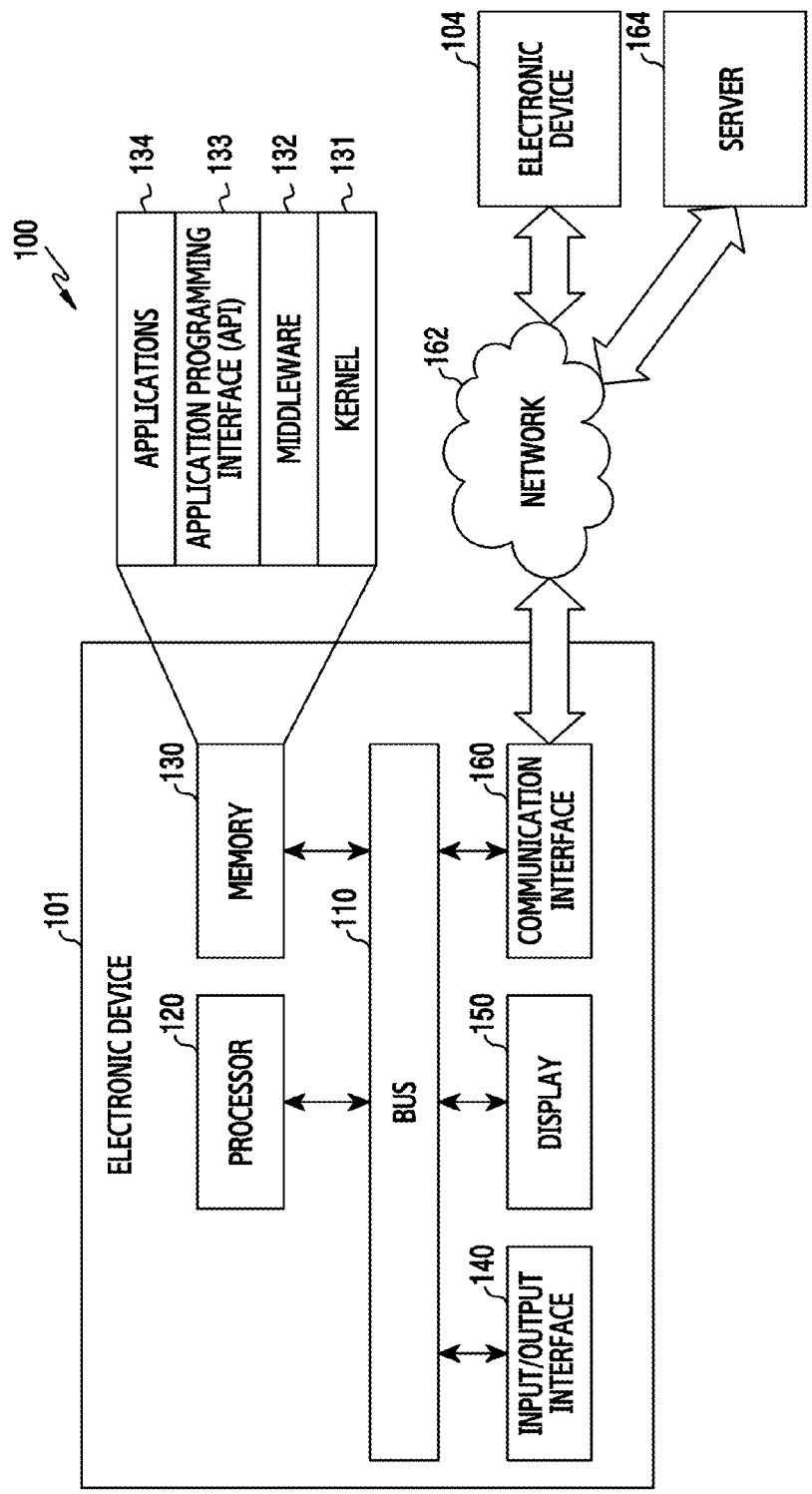
FIG. 1 is a block diagram of a network environment, including an electronic device, according to an embodiment of the present disclosure.

Various embodiments of the present disclosure provide various User Interfaces (Ins) to enable a user to readily check a safety or security level of a selected URL based on a detected reliability of the URL, and thus provide a method and device for securing the safety of the user.

Hereinafter, various embodiments of the present disclosure will be described more fully in conjunction with the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular embodiments disclosed, but the present disclosure should be construed to cover all modifications, equivalents, and alternatives falling within the spirit and scope of the disclosure. In the description of the drawings, identical or similar reference numerals are used to designate identical or similar elements.

As used in present disclosure, the expressions "include", "may include", and other conjugates, refer to the existence of a corresponding disclosed function, operation, or constituent element, and do not limit one or more additional functions, operations, or constituent elements. Further, the terms "has", "have", and their conjugates, are intended merely to denote a certain feature, numeral, step, operation, element, component, or a combination thereof; and should not be construed to exclude the existence of or a possibility of the addition of one or more other features, numerals, steps, operations, elements, components, or combinations thereof.

Further, the expression "or" includes any or all combinations of words enumerated together. For example, the expression "A or B" may include A, may include B, or may include both A and B.

While expressions including ordinal numbers, such as "first" and "second", may modify various constituent elements, such constituent elements are not limited by the above expressions. For example, the above expressions do not limit the sequence and/or importance of the elements. The expressions may be used to distinguish a component element from another component element. For example, a first user device and a second user device indicate different user devices although both of them are user devices. For example, a first constituent element may be referred to as a second constituent element, and likewise a second constituent element may be referred to as a first constituent element without departing from the scope of various embodiments of the present disclosure.

It should be noted that if it is described that one component element is "coupled" or "connected" to another component element, the first component element may be directly coupled or connected to the second component, and a third component element may be "coupled" or "connected" between the first and second component elements. However, when one component element is "directly coupled" or "directly connected" to another component element, it should be construed that a third component element does not exist between the first component element and the second component element.

The terms as used in herein are merely for the purpose of describing particular embodiments and are not intended to limit the scope of the present disclosure. As used herein, the singular forms are intended to include the plural forms as well, unless the context clearly indicates otherwise. Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to various embodiments of the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a portable Portable Multimedia Player (PMP), an MP3 player, a mobile medical device, a camera, a wearable device (e.g., a Head-Mounted Device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliance, as an example of the electronic device, may include at least one of, for example, a television, a Digital Versatile Disk (DVD) player, an audio player, a refrigerator, an air conditioner, a vacuum cleaner, an oven, a microwave oven, a washing machine, an air cleaner, a set-top box, a TV box (e.g., Samsung Home-Sync™, Apple TV™, or Google TV™), a game console, an electronic dictionary, an electronic key, a camcorder, and an electronic picture frame.

According to some embodiments, the electronic device may include at least one of various medical appliances (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), automotive infotainment device, electronic equipment for ships (e.g., ship navigation equipment and a gyrocompass), avionics, security equipment, a vehicle head unit, an industrial or home robot, an Automatic Teller Machine (ATM), and a Point of Sale (POS) device.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like).

An electronic device according to various embodiments of the present disclosure may be a combination of one or more of above described various devices. Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device according to various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

FIG. 1 is a block diagram of a network environment, including an electronic device, according to an embodiment of the present disclosure.

Referring to FIG. 1, a network environment 100, including an electronic device 101, is provided. The electronic device 101 includes a bus 110, a processor 120, a memory 130, an input/output interface 140, a display 150, and a communication interface 160.

The bus 110 is a circuit for connecting the aforementioned component elements and transmitting communication (for example, a control message) between the aforementioned component elements.

The processor 120 receives instructions from the aforementioned other component elements (for example, the memory 130, the input/output interface 140, the display 150, and the communication interface 160) through the bus 110, deciphers the received instructions, and performs calculations or data processing based on the deciphered instructions.

The memory 130 stores instructions or data received from or created by the processor 120 or other components elements (for example, the input/output interface 140, the display 150, and the communication interface 160). The memory 130 may include programming modules, for example, a kernel 131, middleware 132, an Application Programming Interface (API) 133, applications 134 or the like. The aforementioned programming modules may be formed of software, firmware, and hardware, or a combination of at least two thereof.

The kernel 131 controls or manages system resources (for example, the bus 110, the processor 120, and the memory 130) used for executing an operation or a function implemented in the remaining other programming modules, for example, the middleware 132, the API 133, and the applications 134. In addition, the kernel 131 may provide an interface through which the middleware 132, the API 133, or the applications 134 may access the individual component elements of the electronic device 101 to control or manage the same.

The middleware 132 acts as an intermediary to enable the API 133 or the applications 134 to communicate with the kernel 131 to exchange data. Furthermore, in regard to task requests received from the applications 134, the middleware 132 may perform a control (for example, scheduling or load balancing) for the task requests, using a method such as allocating at least one of the applications 134 a priority for using the system resources (for example, the bus 110, the processor 120, and the memory 130) of the electronic device 101.

The API 133 is an interface through which the applications 134 controls functions provided by the kernel 131 and the middleware 132 and includes at least one interface or function (for example, instruction) for file control, window control, image processing, text control, or the like.

According to various embodiments, the applications 134 may include a Short Message Service (SMS)/Multimedia Messaging Service (MMS) application, an email application, a calendar application, an alarm application, a health care application (for example, an application for measuring a quantity of exercise or blood sugar) or an environmental information application (for example, an application for providing information associated with pressure, humidity or temperature). Additionally or alternatively, the applications 134 may include an application related to exchanging information between the electronic device 101 and an electronic device 104). The application related to exchanging information may include, for example, a notification relay application for transferring predetermined information to the external electronic device 104 or a device management application for managing the external electronic device 104.

The notification relay application includes a function for transferring, to the external electronic device 104, notification information generated from other applications of the electronic device 101 (for example, an SMS/MMS application, an e-mail application, a health management application, an environmental information application, or the like). Additionally or alternatively, the notification relay application may receive notification information from, for example, an external electronic device 104 and provides the received notification information to a user.

The device management application manages (for example, installs, deletes, or updates) functions of at least a part of an external electronic device 104 communicating with the electronic device 101 (for example, turning on/off the external electronic device 104 itself (or some component elements thereof) or adjusting brightness (or resolution) of a display), applications operating in the external electronic device 104, or services (for example, a telephone call service or a message service) provided from the external electronic device 104.

According to various embodiments of the present disclosure, the applications 134 may include an application designated based on a property of the external electronic device 104 (for example, the type of the electronic device). For example, in the case where the external electronic device 104 is an MP3 player, the applications 134 may include an application related to the reproduction of music. Similarly, in the case where the external electronic device 104 is a mobile medical appliance, the applications 134 may include an application related to health care. According to an embodiment of the present disclosure, the applications 134 may include at least one of an application designated to the electronic device 101 and an application received from an external electronic device 104 or a server 164.

The input/output interface 140 transfers instructions or data input from a user through an input/output device (for example, a sensor, a keyboard, or a touch screen) to the processor 120, the memory 130, and the communication interface 160 through the bus 110. For example, the input/output interface 140 may provide, to the processor 120, data for a user's touch input through the touch screen. In addition, through the input/output device (for example, a speaker or a display), the input/output interface 140 may output instructions or data received from the processor 120, the memory 130, or the communication interface 160 through the bus 110. For example, the input/output interface 140 may output voice data, processed through the processor 120, to a user through a speaker.

The display 150 displays various types of information (for example, multimedia data or text data) to a user.

The communication interface 160 connects communication between the electronic device 101 and the external electronic device 104 or the server 164. For example, the communication interface 160 may be connected to a network 162 through wireless or wired communication to communicate with the external device 104 or the server 164. The wireless communication may include at least one of, for example, Wi-Fi, Bluetooth (BT), Near Field Communication (NFC), GPS and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM) or the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 is a communication network. The communication network may include at least one of a computer network, the Internet, the Internet of Things, and a telephone network. According to an embodiment of the present disclosure, a protocol (for example, a transport layer protocol, data link layer protocol, or a physical layer protocol) for communication between the electronic device 101 and an external device may be supported by at least one of the applications 134, the application programming interface 133, the middleware 132, the kernel 131, and the communication interface 160.

Figure 2:
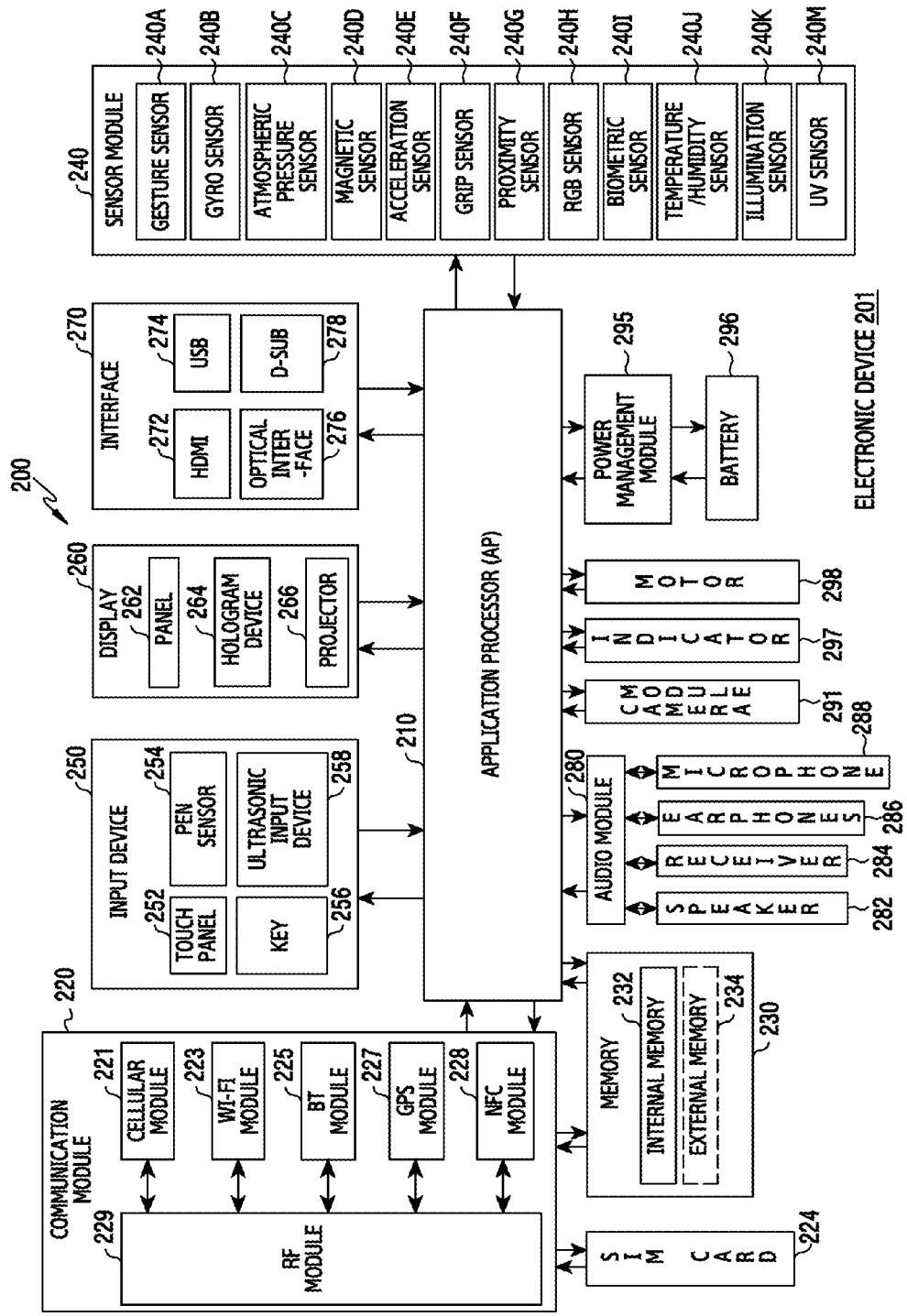
FIG. 2 is a block diagram of an electronic device, according to an embodiment of the present disclosure.

FIG. 2 is a block diagram of an electronic device, according to an embodiment of the present disclosure.

Referring to FIG. 2, block diagram 200 provides a configuration of electronic device 201, according to an embodiment of the present disclosure. The electronic device 201 may configure a part or the entirety of the electronic device 101, illustrated in FIG. 1. The electronic device 201 includes at least one Application Processor (AP) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 (for example, the processor 120) controls a plurality of hardware or software component elements connected to the AP 210 by driving an operating system or an application program, and performs data processing and calculation associated with various data, including multimedia data. The AP 210 may be embodied as, for example, a System on Chip (SoC). According to an embodiment of the present disclosure, the AP 210 may further include a Graphic Processing Unit (GPU).

The communication module 220 (for example, the communication interface 160) performs data transmission/reception in communication between the electronic device 201 (for example, the electronic device 101) and other electronic devices (for example, the external electronic device 104 and the server 164) connected over a network (for example, network 162). According to an embodiment of the present disclosure, the communication module 220 may include a cellular module 221, a Wi-Fi module 223, a BT module 225, a GPS module 227, an NFC module 228, and a Radio Frequency (RF) module 229.

The cellular module 221 provides a voice call, a video call, a text message service, or an Internet service through a communication network (for example, LTE, LTE-A, CDMA, WCDMA, UMTS, WiBro, GSM or the like). Furthermore, the cellular module 221 may distinguish and authenticate electronic devices within a communication network by using, for example, a subscriber identification module (for example, the SIM card 224). According to an embodiment of the present disclosure, the cellular module 221 may perform at least some functions which the AP 210 provides. For example, the cellular module 221 may perform at least some of the multimedia control functions. According to an embodiment of the present disclosure, the cellular module 221 may include a Communication Processor (CP). Furthermore, the cellular module 221 may be embodied as, for example, an SoC. Although the component elements such as the cellular module 221 (for example, a communication processor), the memory 230, the power management module 295 and the like are illustrated as separate component elements from the AP 210 in FIG. 2, the AP 210 may include at least some of the aforementioned component elements (for example, the cellular module 221).

According to an embodiment of the present disclosure, the AP 210 or the cellular module 221 (for example, a communication processor) loads, in a volatile memory, an instruction or data received from at least one of a non-volatile memory and other component elements connected thereto, and processes the loaded instruction or data. Furthermore, the AP 210 or the cellular module 221 stores data received from or generated by at least one of other component elements in a non-volatile memory.

Each of the Wi-Fi module 223, the BT module 225, the GPS module 227, and the NFC module 228 may include, for example, a processor for processing data transmitted or received through a corresponding module. Although FIG. 2 illustrates the cellular module 221, the Wi-Fi module 223, the BT module 225, the GPS module 227, and the NFC module 228 as separate blocks, at least some (for example, two or more) of the cellular module 221, the Wi-Fi module 223, the BT module 225, the GPS module 227, and the NFC module 228 may be included in one Integrated Chip (IC) or one IC package. For example, at least some of the processors corresponding to the cellular module 221, the Wi-Fi module 223, the BT module 225, the GPS module 227, and the NFC module 228 (for example, a CP corresponding to the cellular module 221 and a Wi-Fi processor corresponding to the Wi-Fi module 223), respectively, may be embodied as a single SoC.

The RF module 229 transmits/receives data, for example, an RF signal. Although not illustrated in the drawing, the RF module 229 includes, for example, a transceiver, a Power Amp Module (PAM), a frequency filter, a Low Noise Amplifier (LNA), or the like. Further, the RF module 229 may further include a component for transmitting/receiving electronic waves over a free air space in wireless communication, for example, a conductor, a conducting wire or the like. Although FIG. 2 illustrates that the cellular module 221, the Wi-Fi module 223, the BT module 225, the GPS module 227, and the NFC module 228 share a single RF module 229, at least one of the cellular module 221, the Wi-Fi module 223, the BT module 225, the GPS module 227, and the NFC module 228 may transmit/receive an RF signal through a separate RF module according to an embodiment of the present disclosure.

The SIM card 224 is a card that may be inserted into a slot formed in a predetermined portion of the electronic device. The SIM card 224 includes unique identification information (for example, an Integrated Circuit Card IDentifier (ICCID)) or subscriber information (for example, an International Mobile Subscriber Identity (IMSI)).

The memory 230 (for example, the memory 130) includes an embedded memory 232 or an external memory 234.

The embedded memory 232 may include, for example, at least one of a volatile memory (for example, a Dynamic RAM (DRAM), a Static RAM (SRAM), a Synchronous Dynamic RAM (SDRAM), and the like), and a non-volatile Memory (for example, a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, an NOR flash memory, and the like). According to an embodiment of the present disclosure, the embedded memory 232 may be a Solid State Drive (SSD).

The external memory 234 further include a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 234 may be functionally connected to the electronic device 201 through various interfaces.

According to an embodiment of the present disclosure, the electronic device 201 may further include a storage device (or a storage medium) such as a hard disc drive.

The sensor module 240 measures a physical quantity or detects an operation state of the electronic device 201, and converts the measured or detected information to an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, Red, Green, and Blue (RGB) sensor), a biometric sensor 240I, a temperature/humidity sensor 240J, an illumination sensor 240K, and a Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an Infrared (IR) sensor, an iris sensor, a fingerprint sensor, and the like. The sensor module 240 may further include a control circuit for controlling at least one sensor involved therein.

The input device 250 may include a touch panel 252, a (digital) pen sensor 254, a key 256, or an ultrasonic input device 258.

The touch panel 252 recognizes a touch input in at least one of, for example, a capacitive scheme, a resistive scheme, an infrared scheme, and an ultrasonic wave scheme. Further, the touch panel 252 may further include a control circuit. In the case of the capacitive scheme, physical contact or proximity recognition is possible. The touch panel 252 may further include a tactile layer. In this instance, the touch panel 252 provides a tactile response to the user.

The (digital) pen sensor 254 may be embodied using a method that is the same as or similar to receiving a user's touch input or using a separate recognition sheet.

The key 256 may include a physical button, an optical key, or a keypad.

The ultrasonic input device 258 identifies data by detecting an acoustic wave with a microphone 288 of the electronic device 201 through an input unit generating an ultrasonic signal, and may perform wireless recognition.

According to an embodiment of the present disclosure, the electronic device 201 may receive a user input from an external device (for example, a computer or a server) connected through the communication module 220.

The display 260 (for example, the display 150) may include a panel 262, a hologram device 264, or a projector 266.

The panel 262 may be, for example, a Liquid Crystal Display (LCD) and an Active Matrix Organic Light Emitting Diode (AM-OLED) display, and the like. The panel 262 may be embodied to be flexible, transparent, or wearable. The panel 262 may be integrated with the touch panel 252 as a single module.

The hologram device 264 shows a stereoscopic image in the air using the interference of light.

The projector 266 projects light onto a screen to display an image. The screen may be located inside or outside the electronic device 201.

According to an embodiment of the present disclosure, the display 260 may further include a control circuit for controlling the panel 262, the hologram device 264, or the projector 266.

The interface 270 may include a High-Definition Multimedia Interface (HDMI) 272, a Universal Serial Bus (USB) 274, an optical interface 276, or a D-subminiature (D-sub) 278. The interface 270 may be included in the communication interface 160 illustrated in FIG. 1. Additionally or alternatively, the interface 270 may include a Mobile High-definition Link (MHL) interface, a Secure Digital (SD)/Multi-Media Card (MMC) interface, or an Infrared Data Association (IrDA) standard interface.

The audio module 280 bilaterally converts a sound and an electronic signal. At least some component elements of the audio module 280 may be included in the input/output interface 140 illustrated in FIG. 1. The audio module 280 processes sound information input or output through, for example, a speaker 282, a receiver 284, earphones 286, or a microphone 288.

The camera module 291 is a device for capturing a still image or a video, and according to an embodiment of the present disclosure, may include one or more image sensors (for example, a front sensor or a rear sensor), a lens, an Image Signal Processor (ISP), or a flash (for example, an LED or xenon lamp).

The power management module 295 manages the power of the electronic device 201. The power management module 295 may include a Power Management Integrated Circuit (PMIC), a charger Integrated Circuit (IC), or a battery gauge.

The PMIC may be mounted in integrated circuits or SoC semiconductors.

The charging methods may be classified into wired charging and wireless charging. The charger IC charges a battery and prevents inflow of excessive voltage or excessive current from a charger. According to an embodiment of the present disclosure, the charger IC may include a charger IC for at least one of the wired charging method and the wireless charging method. Examples of the wireless charging include magnetic resonance charging, magnetic induction charging, electromagnetic charging and the like. An additional circuit such as a coil loop, a resonance circuit, a rectifier or the like may be added for the wireless charging.

The battery gauge measures a residual quantity of the battery 296, or a voltage, a current, or a temperature during the charging. The battery 296 stores or generates electricity, and supplies power to the electronic device 201 by using the stored or generated electricity. The battery 296 may include, for example, a rechargeable battery or a solar battery.

The indicator 297 displays a specific status of the electronic device 201 or a part (for example the AP 210) of the electronic device 201, for example, a boot-up status, a message status, a charging status, and the like.

The motor 298 converts an electrical signal into a mechanical vibration.

The electronic device 201 may include a processing device (for example, a GPU) for supporting mobile TV. The processing device for supporting the mobile TV processes media data according to standards, for example, a Digital Multimedia Broadcasting (DMB), a Digital Video Broadcasting (DVB), a media flow, or the like.

The aforementioned elements of the electronic device, according to various embodiments of the present disclosure, may be embodied in one or more components, and the names of the corresponding elements may vary with the type of the electronic device. The electronic device, according to various embodiments of the present disclosure, may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
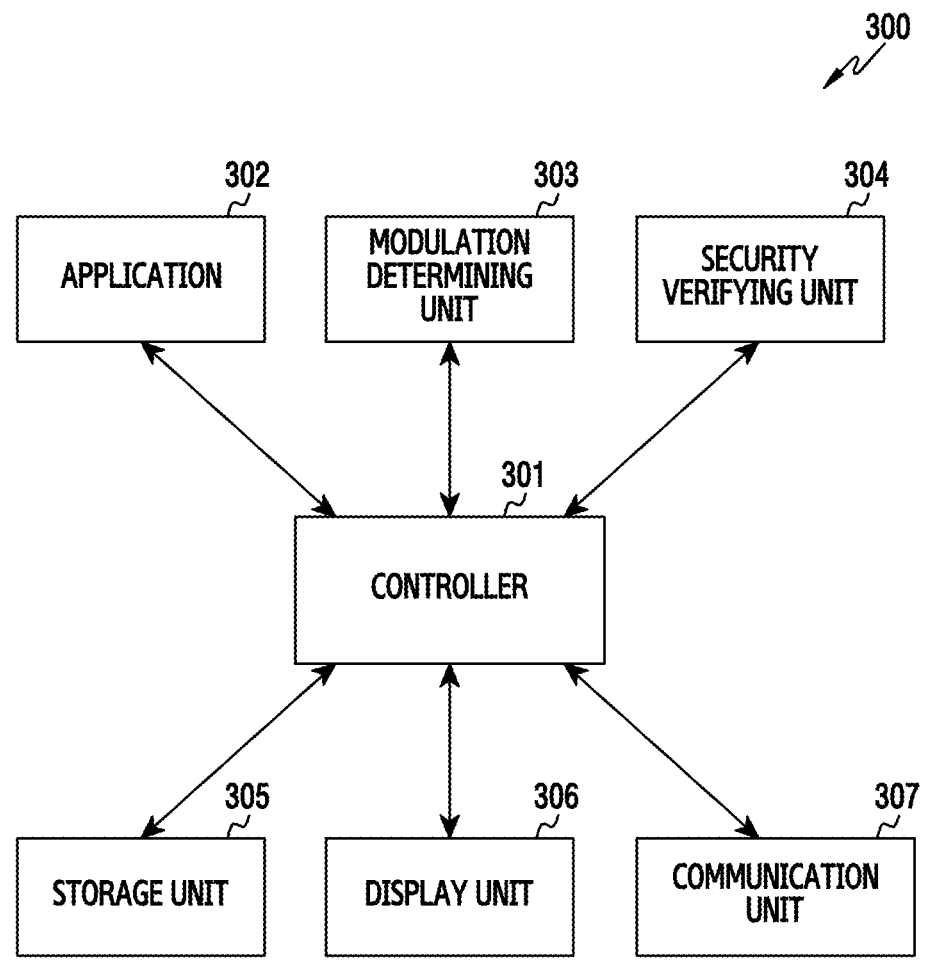
FIG. 3 is a block diagram of an electronic device, according to an embodiment of the present disclosure.

FIG. 3 is a block diagram of an electronic device, according to an embodiment of the present disclosure.

Referring to FIG. 3, the electronic device 300 is provided. The electronic device 300 includes a controller 301, an application 302, a modulation determining unit 303, a security verifying unit 304, a storage unit 305, a display unit 306, and a communication unit 307.

According to various embodiments of the present disclosure, the controller 301 controls general operations of the electronic device 300. The controller 301 controls the application 302, the modulation determining unit 303, the security verifying unit 304, the storage unit 305, the display unit 306, and the communication unit 307.

According to various embodiments of the present disclosure, one or more applications may be installed in the electronic device 300. Application 302 is an application which detects the reliability of a URL selected by a user, and may execute various functions under the control of the controller 301. Application 302 may be used to determine whether a Short Message Service (SMS), a Social Networking Service (SNS), or the electronic device 300 has been hacked.

The modulation determining unit 303, under the control of the controller 301, determines whether a Uniform Resource Locator (URL) selected by a user is modulated, so as to detect the reliability of the URL. The modulation determining unit 303 reads, from the storage unit 305, a first settings file which is the latest updated file and a second settings file, updated immediately before the first settings file, under the control of the controller 301. The modulation determining unit 303 compares the first settings file and the second settings file read from the storage unit 305, for coidentity, under the control of the controller 301. When the modulation determining unit 303 reads the first settings file and the second settings file from the storage unit 305, the controller 301 controls the modulation determining unit 303 to decode the first settings file and the second settings file, which have been encoded and stored. The first settings file and the second settings file may be a host file or a Domain Name System (DNS) Internet Protocol (IP) address file.

The security verifying unit 304, under the control of the controller 301, determines a safety or security level of a URL selected by a user, by working together with the application 302 which detects the reliability of the selected URL. When the application 302 detects the reliability of the URL selected by the user, the security verifying unit 304 detects the reliability provided from the application 302. Based on the detected reliability, the security verifying unit 304 determines a safety or security level of the URL and converts the determined level of the URL into one of a plurality of predefined safety level values.

The storage unit 305 stores a settings file, an IP address information file of a DNS server, and sources of a plurality of URLs received from an external server. When the storage unit 305 stores the settings file, the IP address information file of the DNS server, and the sources of the plurality of URLs, the storage unit 305 encodes and stores the same under the control of the controller 301. The storage unit 305 decodes the settings file, the IP address information file of the DNS server, and the sources of the plurality of URLs, under the control of the controller 301.

The display unit 306 displays various types of information on a display of the electronic device 300, under the control of the controller 301. The display unit 306 displays a URL selected by a user and the source of the URL. The display unit 306 displays a safety level of the selected URL, based on the reliability detected by the security verifying unit 304. The safety level of the URL may be displayed on the display unit 306 in one of a plurality of predetermined colors. The display unit 306 further displays, when the application 302 detects the reliability of the URL, a message that the application is executed. The source and the safety level of the URL may alternately be provided via audio through a speaker of the electronic device 300, or by various vibration strengths or levels of intensity of the motor 298.

The communication unit 307, under the control of the controller 301, transmits and receives data to/from an external electronic device 104 or an external server 164. The communication unit 307 may work in conjunction with the external server 164, and receive updated URL information in real time, from the external server 164. The communication unit 307 may request and receive URL information associated with a URL from an adjacent DNS server.

In the above-described configuration illustrates the general functions of the electronic device 300 which are executed by the controller 301, according to an embodiment of the present disclosure. The various components are illustrated separately to more clearly describe each distinct function in the embodiment of the present disclosure. However, the controller 301 may be embodied to process all the illustrated functions of the electronic device 300 or may be embodied to process some of the illustrated functions.

FIGS. 4A to 4C illustrate a method of providing a safety level of a URL according to various embodiments of the present disclosure.

Referring to FIGS. 4A to 4C, an electronic device 400 displays a URL that enables access to a predetermined IP, on a display of the electronic device 400. The URL is displayed in the form of a hyperlink. According to an embodiment of the present disclosure, the electronic device 400 may display, on the display, a predetermined URL included in a message received from another electronic device.

Referring to FIG. 4A, the electronic device 400 receives, from a user, a selection of the displayed URL. For example, as shown in FIG. 4A, the electronic device 400 receives, from the user, a selection of "http://S.amsu.ng/a.htm" URL 401, displayed in the form of a hyperlink.

The electronic device 400 detects the reliability of the selected URL. The electronic device 400 determines whether the selected URL is modulated. For example, the electronic device 400 reads a first settings file which is the latest updated file and a second settings file which is updated immediately before the first settings file. When reading the first settings file and the second settings file, the electronic device 400 decodes the first settings file and the second settings file which have been encoded and stored.

The electronic device 400 compares the first settings file and the second settings file for coidentity to detect the reliability of the URL selected by the user. For example, the electronic device 400 may compare a first host file (the latest updated host file) and a second host file (a host file updated immediately before the first host file) for coidentity to detect the reliability of the URL selected by the user. As another example, the electronic device 400 may compare a first DNS server IP address file (the latest updated DNS server IP address file) and a second DNS server IP address file (a DNS server IP address file that is updated immediately before the first DNS server IP address file) for coidentity to detect the reliability of the URL selected by the user.

When an application that is capable of detecting the reliability of a URL selected by a user is installed, the electronic device 400 detects the reliability provided from the installed application. For example, when an application, a program, or the like, that is capable of detecting the reliability of a URL, is installed in the electronic device 400, the electronic device 400 executes the application, the program, or the like to detect the reliability of the URL.

According to an embodiment of the present disclosure, the electronic device 400 may detect the reliability of a URL by determining whether the URL is modulated, by using a predetermined application, or by using both methods. The electronic device 400 provides a safety level of the selected URL based on the detected reliability of the URL. The safety level may be one of a plurality of predefined safety levels in a safety class set. The safety class set may be defined in order of high safety level to low safety level, for example, from a high safety level of "class A" to a low safety level of "class E".

Referring to FIG. 4B, when the electronic device 400 detects the reliability of the selected URL ("http://S.amsu.ng/a.htm"), and determines a safety level value as "class B" by converting the detected safety level of the URL into a predefined safety level value, the electronic device 400 displays a message 402, including the determined safety level value, such as "Connection to the URL is safe. Class: B. Would you like to proceed with connection?"

Referring to 4C, when the electronic device 400 detects the reliability of the selected URL ("http://S.amsu.ng/a.htm"), and determines a safety level values as "class E" by converting the detected safety level of the URL into a predefined safety level value, the electronic device 400 displays a message 403, including the determined safety level value, such as "Connection to the URL is unsafe. Class: E. Would you like to proceed with connection?" FIG. 5 illustrates of collecting URL information from a server, according to an embodiment of the present disclosure.

Figure 5:
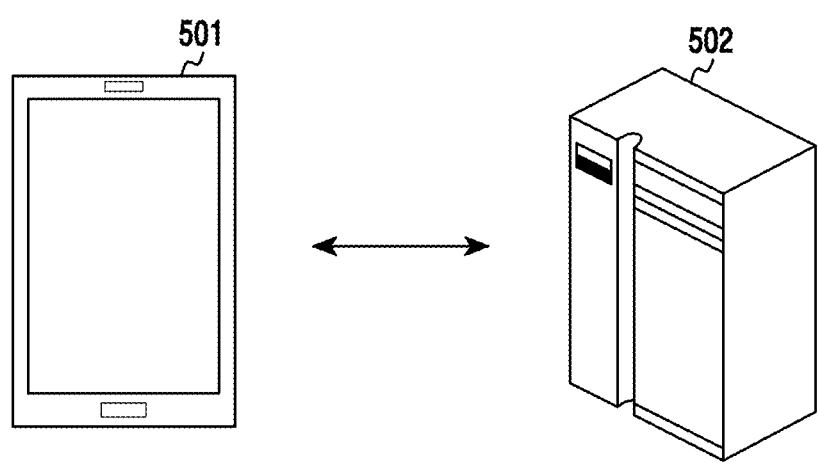
FIG. 5 illustrates a method of collecting URL information from a server, according to an embodiment of the present disclosure.

Referring to FIG. 5, an electronic device 501 and a server 502 are provided. According to various embodiments of the present disclosure, the electronic device 501 may work together with a server 502 in real time and to be provided with information associated with a plurality of URLs and sources of the plurality of URLs from the server. That is, the electronic device 501 uses the information provided from the server 502, to determine a safety level of a URL selected by a user.

The server 502 stores and updates information associated with a plurality of URLs and sources of the URLs in real time. For example, the server 502 stores information indicating that "http://a.bcd.ef/a.htm" is a URL having a source of "company A", that "http://g.hi.j/a.htm" is a URL having a source of "company B", and that "http://b.lac.k/a.htm" is a URL which is listed in a "black list", as will be described below.

The electronic device 501, working together with the server 502 in real time, is provided by the server 502 with information associated with a plurality of updated URLs and sources of the plurality of URLs. Using the above-described example, the server 502 provides the electronic device 501 with the information indicating that "http://a.bcd.ef/a.htm" is a URL having a source of "company A", that "http://g.hi.j/a.htm" is a URL having a source of "company B", and that "http://b.lac.k/a.htm" is a URL which is listed in a "black list".

A URL may be displayed on a display of the electronic device 501. For example, when a URL, such as "http://a.bcd.ef/a.htm", is included in a text message received on the electronic device 501, the electronic device 501 displays the URL of "http://a.bcd.ef/a.htm" together with contents of the received text message.

When the electronic device 501 receives, from a user, a selection of the URL displayed on the display, the electronic device 501 detects the reliability of the selected URL and determines a safety level of the URL based on the detected reliability. The electronic device 501 utilizes URL information provided from the server 502 to determine the safety level of the selected URL based on the detected reliability and to provide a source of the URL. For example, when the electronic device 501 receives a selection of the URL "http://a.bcd.ef/a.htm" the electronic device 501 detects the reliability of the "http://a.bcd.ef/a.htm" URL. The electronic device 501 is provided with URL information from the server 502 indicating that "http://a.bcd.ef/a.htm" is a URL having a source of "company A". The electronic device 501 uses the URL information provided by the server 502 to determine the safety level of "http://a.bcd.ef/a.htm" based on the detected reliability of the URL and to provide source information indicating that the selected URL has a source of "company A".

FIGS. 6A to 6D illustrate a method of providing a safety level of a URL, according to another embodiment of the present disclosure.

Referring to FIGS. 6A to 6D, the electronic device 600 detects the reliability of a URL selected by a user, based on whether the URL is modulated, or based on a reliability provided from an application that is capable of detecting a reliability of a URL. The electronic device 600 determines a safety level of a selected URL based on a detected reliability of the URL and displays the safety level on the display of the electronic device 600. According to an embodiment of the present disclosure, as a safety level becomes lower, the color displayed on the display becomes darker.

The examples which follow with respect to FIGS. 6A to 6D describe the case in which the electronic device 600 receives a selection of "http://s.amsu.ng/a.htm" URL from a user, and safety levels in a safety class set "class 1" to "class 5" (defined in order of high to low safety level) have been predefined.

Referring to FIG. 6A, the electronic device 600 detects the reliability of the selected URL ("http://s.amsu.ng/a.htm") and determines the safety level of the URL. The electronic device 600 determines the safety level value as "class 1", which indicates the highest safety level, by converting the detected safety level of the URL into a predefined safety level value. The electronic device 600 displays a message 601, including the determined safety level value, such as "Connection to the URL is safe. Class: 1. Would you like to proceed with connection?" Additionally or alternatively, an audio message 602, or various vibration strengths or levels of intensity of the motor 298, may be provided. When the electronic device 600 displays the message 601 on the display, the electronic device 600 may display the message 601 in a color set as level 1 (which is the lightest color among colors in a predefined number of color levels).

Referring to FIG. 6B, the electronic device 600 detects the reliability of the selected URL ("http://s.amsu.ng/a.htm") and determines the safety level of the URL. The electronic device 600 determines the safety level value as "class 2", which indicates the second highest safety level, by converting the detected safety level of the URL into a predefined safety level value. The electronic device 600 displays a message 603, including the determined safety level value, such as "Connection to the URL is safe. Class: 2. Would you like to proceed with connection?" Additionally or alternatively, an audio message 604 may be provided. When the electronic device 600 displays the message 603 on the display, the electronic device 600 may display the message 603 in a color set as level 2 (which is the second lightest color among colors in a predefined number of color levels).

Referring to FIG. 6C, the electronic device 600 detects the reliability of the selected URL ("http://s.amsu.ng/a.htm") and determines the safety level of the URL. The electronic device 600 determines the safety level value as "class 3", which indicates the third highest safety level, by converting the detected safety level of the URL into a predefined safety level value. The electronic device 600 displays a message 605, including the determined safety level value, such as "Connection to the URL is safe. Class: 3. Would you like to proceed with connection?" Additionally or alternatively, an audio message 606, or various vibration strengths or levels of intensity of the motor 298, may be provided. When the electronic device 600 displays the message 605 on the display, the electronic device 600 may display the message

605 in a color set as level 3 (which is the third lightest color among colors in a predefined number of color levels).

Referring to FIG. 6D, the electronic device 600 detects the reliability of the selected URL ("http://s.amsu.ng/a.htm") and determines the safety level of the URL. The electronic device 600 determines the safety level value as "class 5", which indicates the lowest safety level, by converting the detected safety level of the URL into a predefined safety level value. The electronic device 600 displays a message 607, including the determined safety level value, such as "Connection to the URL is unsafe. Class: 5. Would you like to proceed with connection?" Additionally or alternatively, an audio message 608, or various vibration strengths or levels of intensity of the motor 298, may be provided. When the electronic device 600 displays the message 607 on the display, the electronic device 600 may display the message 607 in a color set as level 5 (which is the darkest color among colors in a predefined number of color levels).

Although the present embodiment describes that the color of a display provided by the electronic device 600 becomes darker as the safety level of a URL becomes lower, the above described embodiment is merely an example, and the color of the display may become lighter, or brightness, chroma, or the like may be used to indicate the level of safety of the URL.

Figures 7A, 7B:
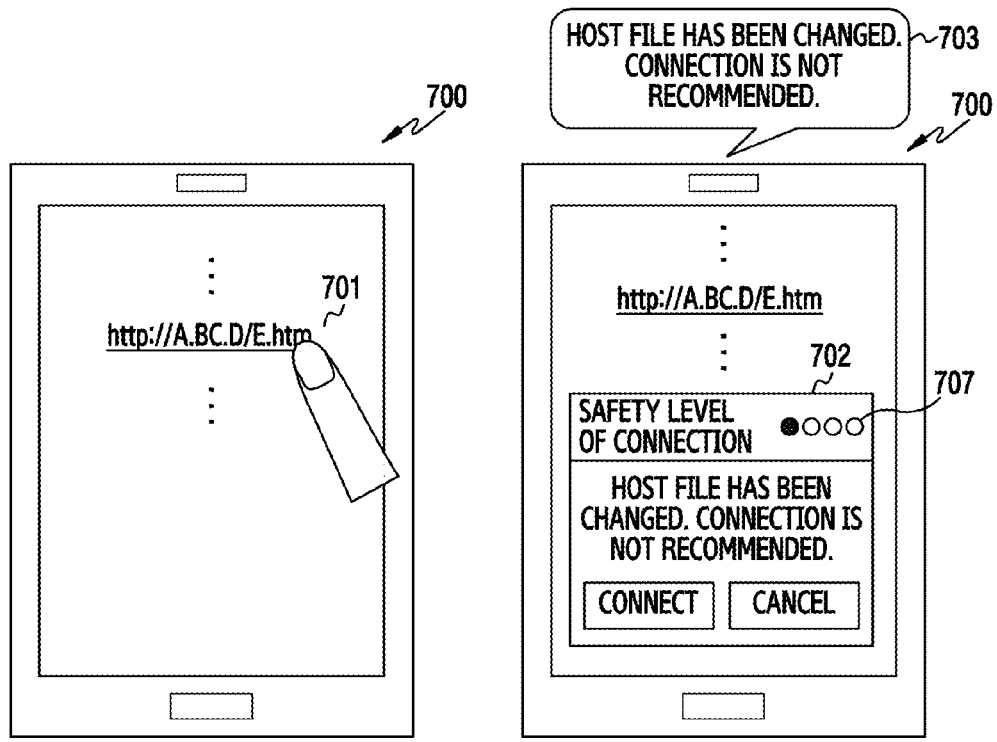
FIGS. 7A to 7C illustrate a method of providing a safety level of a URL, according to another embodiment of the present disclosure.
Figure 7C:
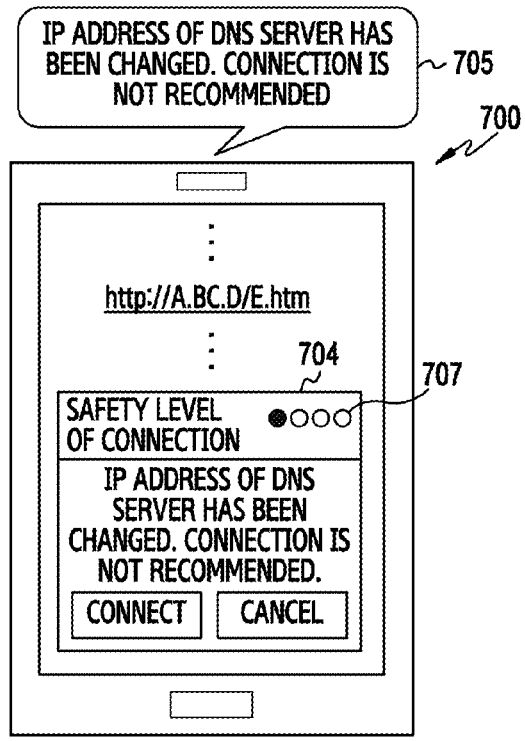

FIGS. 7A to 7C illustrate a method of providing a safety level of a URL, according to another embodiment of the present disclosure.

Referring to FIGS. 7A to 7C, the electronic device 700, an electronic device 700 receives a selection of a URL displayed on a display of the electronic device 700, from a user.

For example, referring to FIG. 7A, the electronic device 700 may receive a selection of "http://A.BC.D/E.htm" URL 701, displayed in a hyperlink form, from a user.

The electronic device 700 may detect the reliability of the selected URL by determining whether the selected URL is modulated. To determine whether the selected URL is modulated, the electronic device 700 reads a first settings file, which is the latest updated file, and a second settings file, which is updated immediately before the first settings file. When reading the first settings file and the second settings file, the electronic device 700 decodes the first settings file and the second settings file, which have been encoded and stored. The electronic device 700 compares the first settings file and the second settings file for coidentity to detect the reliability of the URL selected by the user.

According to an embodiment of the present disclosure, the electronic device 700 may compare a first host file (the latest updated host file) and a second host file (a host file updated immediately before the first host file) to detect the reliability of the URL selected by the user. That is, the electronic device 700 compares the first host file and the second host file for coidentity, and determines a safety level of the selected URL.

Referring to FIG. 7B, the electronic device 700 compares the first host file and the second host file for coidentity and determines that the coidentity does not exist. The electronic device 700 displays a message 702, including the determined safety level of the selected URL, such as "Host file has been changed. Connection is not recommended." Additionally or alternatively, an audio message 703, or various vibration strengths or levels of intensity of the motor 298, may be provided.

According to another embodiment of the present disclosure, the electronic device 700 may compare a first DNS server IP address file (the latest updated DNS server IP address file) and a second DNS server IP address file (a DNS server IP address file that is updated immediately before the first DNS server IP address file) for coidentity to detect the reliability of the URL selected by the user. That is, the electronic device 700 compares the first DNS server IP address file and the second DNS server IP address file for coidentity, and determines a safety level of the selected URL.

Referring to FIG. 7C, the electronic device compares the first DNS server IP address file and the second DNS server IP address file for coidentity and determines that coidentity does not exist. The electronic device 700 displays a message 704, including the determined safety level of the selected URL, such as "IP address of the DNS server has been changed. Connection is not recommended." Additionally or alternatively, an audio message, or various vibration strengths or levels of intensity of the motor 298, may be provided.

When an application, a program or the like that is capable of detecting a reliability of a predetermined URL is installed in the electronic device, the electronic device 700 may execute the application, the program or the like to detect the reliability of the selected URL.

In the above described embodiment, as illustrated in FIGS. 7B and 7C, the electronic device 700 determines that the safety level of the URL is low and thus, the electronic device 700 displays as selected, one of a total of four safety level icons 707. When the electronic device 700 determines that the safety level of the URL is high, three or more of the four safety level icons 707 may be selected.

FIGS. 8A and 8B illustrate a method of providing a safety level of a URL, according to another embodiment of the present disclosure.

Referring to FIGS. 8A and 8B, the electronic device 800 detects the reliability of a URL selected by a user based on URL information received from a server. The electronic device 800 determines a safety level of a selected URL based on a detected reliability of the URL and displays the safety level on the display of the electronic device 800.

The examples which follow with respect to FIGS. 8A and 8B describe the case in which the electronic device 800 receives a selection of "http://a.bc.d/a.htm" URL from a user, safety levels in a safety class set of "class 1" to "class 5" (defined in order of high to low safety level) have been predefined, and the electronic device 800 is set to display a safety level message in darker color as the safety level of a URL becomes lower.

Referring to FIG. 8A, the selected URL is included in URL source information received from a server and "application A" is installed on the electronic device 800 as an application that is capable of detecting a reliability of a URL selected by a user.

The electronic device 800 detects the reliability of a selected URL by determining whether the selected URL is modulated and by using the reliability provided from "application A."

In FIG. 8A, the electronic device 800 detects the reliability of the URL selected by the user based on a determined safety level value of "class 1" and additionally determines that a fishing/hacking attempt is not detected by executing the "application A", the electronic device 800 then displays message 801.

For example, as shown in FIG. 8A, the electronic device 800 displays, on the display of the electronic device 800, class information, such as "Safety class of the connection: Class 1" message 802, URL information, such as "URL of 'Samsung Electronics'" message 803, stability information, such as "Fishing/hacking attempt has not been reported" message 804, application information, such as "Security check: application A" message 805. In addition the electronic device 800 may provide the message 801 displayed in the lightest color of the set color levels.

Referring to FIG. 8B, the selected URL is not included in URL source information received from a server and "application C" is installed as an application that is capable of detecting a reliability of a URL selected by a user. According to various embodiments of the present disclosure, the electronic device 800 detects the reliability of a selected URL, by determining whether the selected URL is modulated and by using the reliability provided from "application C".

In FIG. 8B, the electronic device 800 detects the reliability of the URL selected by the user based on a determined safety level value of "class 5", indicating the lowest reliability among set five classes, and additionally determines that a fishing/hacking attempt is detected by executing "application C". The electronic device 800 then displays a message 806.

For example, as shown in FIG. 8B, the electronic device displays, on the display of the electronic device 800, class information, such as "Safety class of the connection: Class 5" message 807, URL information, such as "Registrant of Domain: B Corporation." Message 808, stability information, such as "Fishing/hacking attempt has been reported" message 809, application information, such as "Security check: application C" 810. In addition, the electronic device 800 may provide the message 806 to be displayed in the darkest color of the set color levels.

In addition, if the selected URL is not stored in the electronic device, the electronic device requests URL information from an adjacent DNS server, receives the URL information from the DNS server, and provides a source of the URL based on the received URL information.

Figure 9:
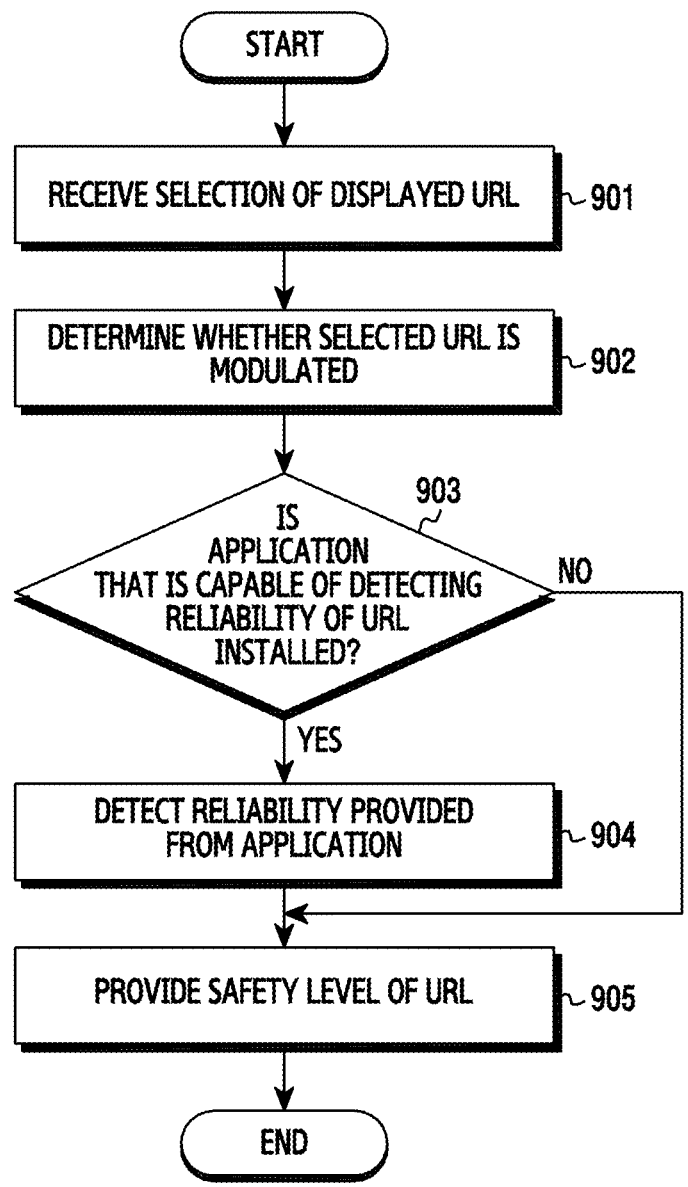
FIG. 9 is a flowchart illustrating a method of providing a safety level of a URL, according to an embodiment of the present disclosure.

FIG. 9 is a flowchart illustrating a method of providing a safety level of a URL, according to an embodiment of the present disclosure.

Referring to FIG. 9, the electronic device receives a selection of a displayed URL in operation 901. For example, the electronic device displays, on the display, a URL included in a message received from another electronic device, and may receives a selection of the displayed URL from a user.

In operation 902, the electronic device determines whether the selected URL is modulated. The electronic device reads a first settings file which is the latest updated file and a second settings file which is updated immediately before the first settings file. When reading the first settings file and the second settings file, the electronic device decodes the first settings file and the second settings file which have been encoded and stored. The electronic device compares the first settings file and the second settings file for coidentity to detect the reliability of the URL selected by the user. For example, the electronic device may compare a first host file (the latest updated host file) and a second host file (a host file updated immediately before the first host file) for coidentity to detect the reliability of the URL selected by the user. As another example, the electronic device may compare a first DNS server IP address file (the latest updated DNS server IP address file) and a second DNS server IP address file (a DNS server IP address file that is updated immediately before the first DNS server IP address file) for coidentity to detect the reliability of the URL selected by the user.

In operation 903, the electronic device determines whether an application that is capable of detecting the reliability of a URL is installed. According to an embodiment of the present disclosure, the application that is capable of detecting the reliability of a URL may be a vaccine program, a separate application that is capable of detecting a reliability of a URL selected in an electronic device, or the like.

When the electronic device determines that the application that is capable of detecting a reliability of a URL is not installed, the electronic device proceeds to operation 905.

When the electronic device determines that the application that is capable of detecting the reliability of a URL is installed, in operation 904, the electronic device detects a reliability provided from the application. When an application, a program or the like that is capable of detecting a reliability of a predetermined URL is installed in the electronic device, the electronic device executes the application, the program or the like that detects the reliability of the predetermined URL so as to detect the reliability of the selected URL.

In operation 905, the electronic device determines and provides a safety level of the URL.

For example, the electronic device receives a selection of "http://s.amsu.ng/a.htm" URL from a user, and safety levels in a safety class set of "class A" to "class E" have been predefined.

If the electronic device detects the reliability of the selected URL ("http://s.amsu.ng/a.htm"), and determines a safety level value of "class B" by converting a determined safety level of the URL into a predefined safety level value, the electronic device provides a display message and/or an audio message, including the determined safety level value, such as "Connection to the URL is safe. Class: B. Would you like to proceed with connection?"

If the electronic device detects the reliability of the selected URL ("http://s.amsu.ng/a.htm"), and determines a safety level of "class E" by converting a determined safety level of the URL into a predefined safety level value, the electronic device provides a display message and/or an audio message, including the determined safety level value, such as "Connection to the URL is unsafe. Would you like to proceed with connection?"

Figure 10:
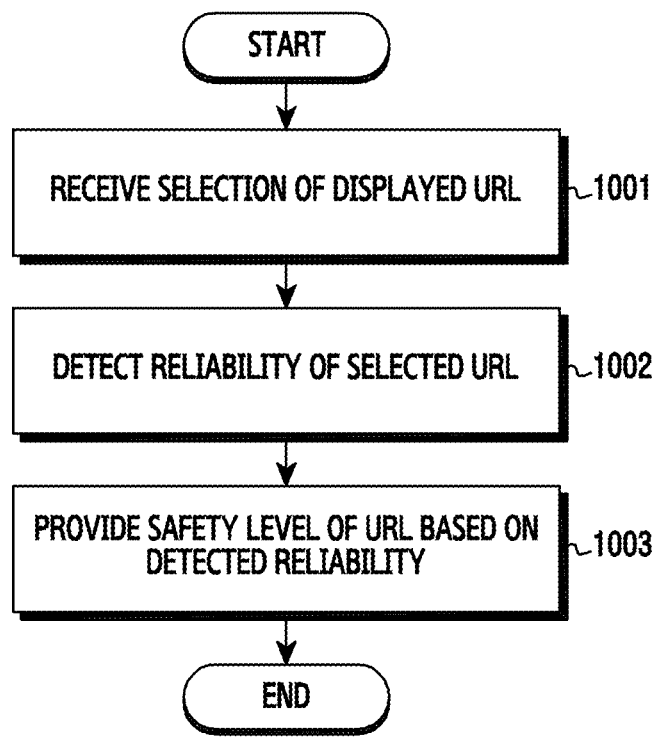
FIG. 10 is a flowchart illustrating a method of providing a safety level of a URL, according to another embodiment of the present disclosure.

FIG. 10 is a flowchart illustrating a method of providing a safety level of a URL, according to another embodiment of the present disclosure.

Referring to FIG. 10, the electronic device receives a selection of a displayed URL in operation 1001. For example, the electronic device displays, on the display of the electronic device, a URL included in a message received from another electronic device, and receives a selection of the displayed URL from a user.

In operation 1002, the electronic device detects the reliability of the selected URL. When the electronic device is capable of determining whether the selected URL is modulated, and an application that is capable of detecting the reliability of a URL selected by a user is installed, the electronic device detects a reliability provided from the installed application. The method of detecting the reliability of a URL selected by a user may be based on determining whether the URL is modulated or by using the reliability determined by a predetermined application. That is, the electronic device may detect the reliability of a URL by determining whether the URL is modulated, by using a predetermined application, or by using both methods.

In operation 1003, the electronic device provides a safety level of the URL based on the detected reliability. For example, if the electronic device detects the reliability of the selected URL, and determines a safety level value of "class 3", which indicates the third highest safety level, by converting a determined safety level of the URL into a predefined safety level value, the electronic device provides a message, including the determined safety level value, such as "Connection to the URL is safe. Class: 3. Would you like to proceed with connection?" The message may be displayed on the electronic device or may be provided in the form of an audio message. If the electronic device detects the reliability of the selected URL, and determines a safety class level value of "class 5", which indicates the lowest safety level, by converting a determined safety level of the URL into a set predefined safety level value, the electronic device provides a message, including the determined safety level value, such as "Connection to the URL is unsafe. Class: 5. Would you like to proceed with connection?" The message may be displayed on the electronic device or may be provided in the form of an audio message.

Embodiments of the present disclosure provided in the present specifications and drawings are merely examples used to readily describe the technology associated with the present disclosure, and to help in an understanding of the present disclosure, but do not limit the scope of the present disclosure. Therefore, in addition to the embodiments disclosed herein, the scope of the present disclosure should be construed to include all modifications or modified forms drawn based on the technical idea of the various embodiments of the present disclosure. Therefore, the scope of the disclosure is defined not by the detailed description of the embodiments, but by the following claims and their equivalents.

What is claimed is:

1. A method of an electronic device, the method comprising:
    detecting an input of a uniform resource locator (URL) displayed on a display of the electronic device;
    determining a reliability of the URL; and
    providing a safety level of the URL, based on the determined reliability,
    wherein determining the reliability of the URL comprises:
        identifying a first settings file regarding the URL and a second settings file regarding the URL, wherein the first settings file is the latest updated and the second settings file is updated before the first settings file is updated; and
        determining whether the URL is modulated by comparing the first settings file and the second settings file for coidentity.

2. The method of claim 1, wherein identifying the first settings file and the second settings file comprises decoding the first settings file and the second settings file, which have been encoded and stored.

3. The method of claim 1, wherein the first settings file and the second settings file include a host file and a Domain Name System (DNS) Internet Protocol (IP) address file.

4. The method of claim 1, wherein determining the reliability of the URL comprises when an application that is capable of determining the reliability of the URL is installed, determining the reliability provided from the application.

5. The method of claim 1, wherein providing the safety level of the URL comprises:
    converting the safety level of the URL into one of predefined values, based on the determined reliability; and
    displaying the converted value or providing the converted value through voice.

6. The method of claim 1, providing the safety level of the URL comprises displaying the safety level of the URL in one of predefined color, based on the determined reliability.

7. The method of claim 1, wherein providing the safety level of the URL comprises when the reliability of the URL is determined from a predetermined application, displaying that the application is executed.

8. The method of claim 1, wherein providing the safety level of the URL comprises when the URL is stored, providing a source of the URL.

9. The method of claim 1, wherein providing the safety level of the URL comprises:
    when the URL is not stored, requesting information associated with the URL from a neighboring DNS server;
    receiving the information associated with the URL from the DNS server; and
    providing a source of the URL, based on the received URL information.

10. An electronic device, the device comprising:
    a display; and
    a processor configured to:
    detect an input of a uniform resource locator (URL) displayed on the display,
    determine a reliability of the URL, and
    provide a safety level of the URL based on the determined reliability,
    wherein, in order to determine the reliability, the processor is further configured to:
        identify a first settings file regarding the URL and a second settings file regarding the URL, wherein the first settings file is the latest updated and the second settings file is updated before the first settings file is updated; and
        determine whether the URL is modulated by comparing the first settings file and the second settings file for coidentity.

11. The device of claim 10, wherein the processor is further configured to decode the first settings file and the second settings file, which have been encoded and stored in the memory.

12. The device of claim 10, wherein the first settings file and the second settings file include a host file and a Domain Name System (DNS) Internet Protocol (IP) address file.

13. The device of claim 10, wherein, when an application that is capable of determining the reliability of the URL is installed, the processor is further configured to determine the reliability provided from the application.

14. The device of claim 10, wherein the processor is further configured to convert the safety level of the URL into one of predefined values based on the determined reliability, and to provide the converted value on the display or provide the converted value through audio.

15. The device of claim 10, wherein when the URL is stored in a memory, the processor is further configured to provide a source of the URL through the display and a speaker.

16. The device of claim 10, further comprising:
    a communication module configured to request information associated with the URL from a neighboring DNS server when the URL is not stored, and to receive the information associated with the URL from the DNS server,
    wherein the processor is further configured to provide a source of the URL through the display and a speaker based on the received URL information.

* * * * *